(12) United States Patent
Zeisberg et al.

(10) Patent No.: US 9,951,894 B2
(45) Date of Patent: Apr. 24, 2018

(54) PIPE COMPONENT AND METHOD FOR MANUFACTURING A PIPE COMPONENT

(71) Applicant: Senior IP GmbH, Schaffhausen (CH)

(72) Inventors: Patrick Zeisberg, Espenau (DE); Stephan Hillebrand, Witzenhausen (DE)

(73) Assignee: Senior IP GmbH, Schaffhausen (CH)

( * ) Notice: Subject to any disclaimer, the term of this patent is extended or adjusted under 35 U.S.C. 154(b) by 239 days.

(21) Appl. No.: 14/407,723

(22) PCT Filed: Jun. 14, 2013

(86) PCT No.: PCT/EP2013/062375
§ 371 (c)(1),
(2) Date: Dec. 12, 2014

(87) PCT Pub. No.: WO2013/186360
PCT Pub. Date: Dec. 19, 2013

(65) Prior Publication Data
US 2015/0184778 A1    Jul. 2, 2015

(30) Foreign Application Priority Data

Jun. 14, 2012   (DE) ......................... 10 2012 210 045

(51) Int. Cl.
*F16L 11/00* (2006.01)
*F16L 11/15* (2006.01)
(Continued)

(52) U.S. Cl.
CPC .............. *F16L 11/15* (2013.01); *B21D 15/06* (2013.01); *B21D 17/02* (2013.01); *B21D 39/048* (2013.01);
(Continued)

(58) Field of Classification Search
CPC .................................. F16L 11/12; F16L 11/15
(Continued)

(56) References Cited

U.S. PATENT DOCUMENTS 3,714,311 A * 1/1973 Stefanka ................. B29C 53/30
138/121
3,995,438 A   12/1976 Pogonowski
(Continued)

FOREIGN PATENT DOCUMENTS

DE         19632756 A1    2/1998
DE         20023409 U1    3/2004
(Continued)

*Primary Examiner* — Vishal Pancholi
(74) *Attorney, Agent, or Firm* — The Webb Law Firm (57) ABSTRACT

A pipe component with an outer pipe element and at least one inner pipe element arranged inside the outer pipe element is provided. The outer pipe element is formed as a flexible pipe element with a plurality of projections, in particular corrugations, and/or at least one corrugated portion. On at least one point the outer pipe element and the at least one inner pipe element each have a projection pointing to the outside in a radial direction, wherein the outside of the projection of the at least one inner pipe element at least partly flatly rests against the inside of the projection of the outer pipe element or of another inner pipe element, so that by means of the projections a connection exists between the at least one inner pipe element and the outer pipe element. The invention furthermore relates to a method for manufacturing a pipe component.

22 Claims, 5 Drawing Sheets

(51) Int. Cl.
*B21D 17/02* (2006.01)
*F16L 11/20* (2006.01)
*B21D 39/04* (2006.01)
*F16L 7/00* (2006.01)
*B21D 15/06* (2006.01)
*B29C 57/04* (2006.01)
*F16L 11/12* (2006.01)
*F01N 13/18* (2010.01)

(52) U.S. Cl.
CPC ............... *B29C 57/04* (2013.01); *F16L 7/00* (2013.01); *F16L 11/12* (2013.01); *F16L 11/20* (2013.01); *F01N 13/1805* (2013.01); *F01N 13/1816* (2013.01)

(58) Field of Classification Search
USPC .................................................. 138/121, 173
See application file for complete search history.

(56) References Cited

U.S. PATENT DOCUMENTS

| | | | |
|---|---|---|---|
| 4,307,754 A * | 12/1981 | Muratsubaki | F16L 11/118 138/103 |
| 6,125,889 A | 10/2000 | Elsasser et al. | |
| 8,220,498 B2 | 7/2012 | Van Hooren et al. | |
| 2004/0100094 A1* | 5/2004 | Thomas | F01N 13/1816 285/226 |
| 2011/0056582 A1 | 3/2011 | Walle et al. | |
| 2013/0105026 A1 | 5/2013 | Biaggi et al. | |

FOREIGN PATENT DOCUMENTS

| | | |
|---|---|---|
| DE | 202004008089 U1 | 9/2004 |
| DE | 202006011404 U1 | 11/2006 |
| DE | 102005052204 A1 | 6/2007 |
| DE | 102007004766 A1 | 8/2008 |
| DE | 102007009906 A1 | 9/2008 |
| DE | 202007013515 U1 | 3/2009 |
| DE | 102007052243 A1 | 5/2009 |
| DE | 202009008648 U1 | 10/2009 |
| EP | 0590188 A1 | 4/1994 |
| EP | 0957244 A2 | 11/1999 |
| EP | 1291501 A1 | 3/2003 |
| EP | 1705347 B1 | 7/2008 |
| EP | 2042701 A1 | 4/2009 |
| EP | 2203632 B1 | 4/2011 |
| FR | 1505086 | 12/1967 |
| WO | 2005113957 A1 | 12/2005 |
| WO | 2011092440 A1 | 8/2011 |

* cited by examiner

PIPE COMPONENT AND METHOD FOR MANUFACTURING A PIPE COMPONENT

CROSS-REFERENCE TO RELATED APPLICATIONS

This application is the United States national phase of International Application No. PCT/EP2013/062375 filed Jun. 14, 2013, and claims priority to German Patent Application No. 10 2012 210 045.8 filed Jun. 14, 2012, the disclosures of which are hereby incorporated in their entirety by reference.

BACKGROUND OF THE INVENTION

This invention relates to a pipe component and to a method for manufacturing a pipe component.

In many fields of technology, such as in the automotive industry, it is frequently required to connect two or more pipes arranged inside each other, between which an air gap is formed, with each other. Together, the pipes should still have a certain flexibility, but they should also be connected so as to be non-rotatable against each other.

It is known to connect the two pipes with each other by welding spots or seams. This regularly requires a special construction of the pipes in the vicinity of the welding seam.

SUMMARY OF THE INVENTION

It is an object of the present invention to provide a pipe component and a method for manufacturing a pipe component, whose inner and outer pipes are connectable with each other in a simple way.

This object is solved by a pipe component with the features of claim 1 as described herein.

An outer pipe element and at least one inner pipe element arranged inside the outer pipe element are connected with each other via a projection. The outer pipe element is formed as flexible pipe element with a plurality of projections, in particular corrugations and/or at least one corrugated portion.

On at least one point, the outer pipe element and the at least one inner pipe element each have a projection pointing to the outside in radial direction, wherein the outside of the projection of the at least one inner pipe element at least partly flatly rests against and conforms with the inside of the projection of the outer pipe element or against the inside of another inner pipe element (when there is more than one inner pipe element), so that by means of the projections a connection exists between the at least one inner pipe element and the at least one outer pipe element.

The at least one inner pipe element need not be formed integrally. Advantageously, it includes at least two pipe sections and at least one connecting element for connecting the pipe sections. The projection pointing radially to the outside also can be arranged at the connecting element. The inner pipe element can be a more complex component, which is composed of several parts or is put together during the manufacture of the pipe component.

The at least one inner pipe element, however, also can include a pipe section, in particular a substantially smooth pipe section (e.g. it is no corrugated tube)—apart from the projection. Since a pipe component also can include a plurality of inner pipe elements, a combination of composite pipe sections and one-piece pipes also is possible. By a substantially smooth inner pipe, the flow resistance is decreased.

Advantageously, the at least one inner pipe element is formed as flexible pipe element.

In one embodiment, the projections are at least partly circumferentially formed around the outer pipe element and around the at least one inner pipe component.

Thus, a positive connection is ensured in particular in axial direction. Alternatively, one embodiment can include a positive radial connection by substantially punctual protrusions. Such punctual deformations can be produced e.g. by pointed punching tools.

It is also advantageous when at least one connection is formed as positive, non-positive and/or cohesive connection, in particular as a non-rotatable connection.

Furthermore, it is advantageous when the wall thickness of the outer pipe element is smaller than the wall thickness of the at least one inner pipe element.

In an advantageous embodiment of the pipe component, the outer pipe element and/or the at least one inner pipe element at least partly includes a flexible corrugated portion. Pipe components with the non-rotatable connection by projections are suitable in particular for pipe components which are exposed to mechanical loads, as they occur for example in an exhaust-gas component or in exhaust-gas tubes in motor vehicles.

It is particularly advantageous when the outer pipe element includes at least two corrugated portions, and the connection between the outer pipe element and the at least one inner pipe element is arranged, in particular centrally, between the two corrugated portions.

For the connection with other components it is advantageous when on at least one of the ends of the at least one inner pipe element a flange element is arranged. It is also advantageous when the outer pipe element and the at least one inner pipe element are connected with each other, in particular welded to each other, at the axial ends of the exhaust-gas pipe component.

In another embodiment a sleeve-shaped spacer is arranged between the at least one inner pipe element and the at least one outer pipe element. This spacer avoids the contact, and hence possibly also wear, which can exist between the outer and the inner pipe element.

Advantageously, the at least one connecting element keeps a distance between the at least one inner pipe element and the outer pipe element. In this construction, the connecting element also serves as spacer between inner and outer pipe element.

The object also is solved by a method with the features as described herein.

In a first step, at least one inner pipe element is arranged in an outer pipe element with a plurality of projections, in particular corrugations and/or at least one corrugated portion.

Subsequently, a deforming tool is introduced into the at least one inner pipe element.

Proceeding from the deforming tool, a plastic deformation of the at least one inner pipe element and of the outer pipe element is effected radially to the outside, wherein the deformation is carried out such that the outside of a projection of the at least one inner pipe element at least partly flatly rests against the inside of the projection of the outer pipe element or against the inside of the projection of another inner pipe element (for the case that more than one inner pipe element is used), so that by means of the projections a connection is produced between the at least one inner pipe element and the outer pipe element.

An advantageous embodiment of the method includes a deforming tool which includes elements with a substantially arc-shaped outer contour, which are movable radially to the outside. It is also possible that the deforming tool includes elements with a contour pointing substantially acutely to the outside, which are movable radially to the outside. Hence it is possible to carry out substantially point-shaped plastic deformations in the outer pipe element and the inner pipe element.

As deforming tool, advantageous embodiments of the method include a spreading tool, a hydroforming tool, a device for deforming with elastomers, a device for electromagnetic shaping and/or a device for roll forming.

When forming the projection according to another embodiment, a female die is held against the outside of the outer pipe element as a negative mold for the projection.

It can also be advantageous when a plastic deformation of the at least one inner pipe element is effected radially to the outside from the deforming tool such that a smooth pipe or a connecting element is deformed. In both cases, the deformation of the projection of the inner pipe element is effected in situ.

Alternatively or in addition, the connecting element also can be preformed already with a bulge, wherein the outside of the projection of the at least one inner pipe element at least partly flatly rests against the inside of the projection of the outer pipe element or against the inside of the projection of another inner pipe element, so that by means of the projections a connection is produced between the at least one inner pipe element and the outer pipe element.

It is also possible that the deforming tool performs a plastic deformation of the at least one inner pipe element radially to the outside such that a smooth pipe or a connecting element is deformed.

BRIEF DESCRIPTION OF THE DRAWINGS

Embodiments of the invention will be shown by way of example in the following Figures, in which.

Figures 1, 2:
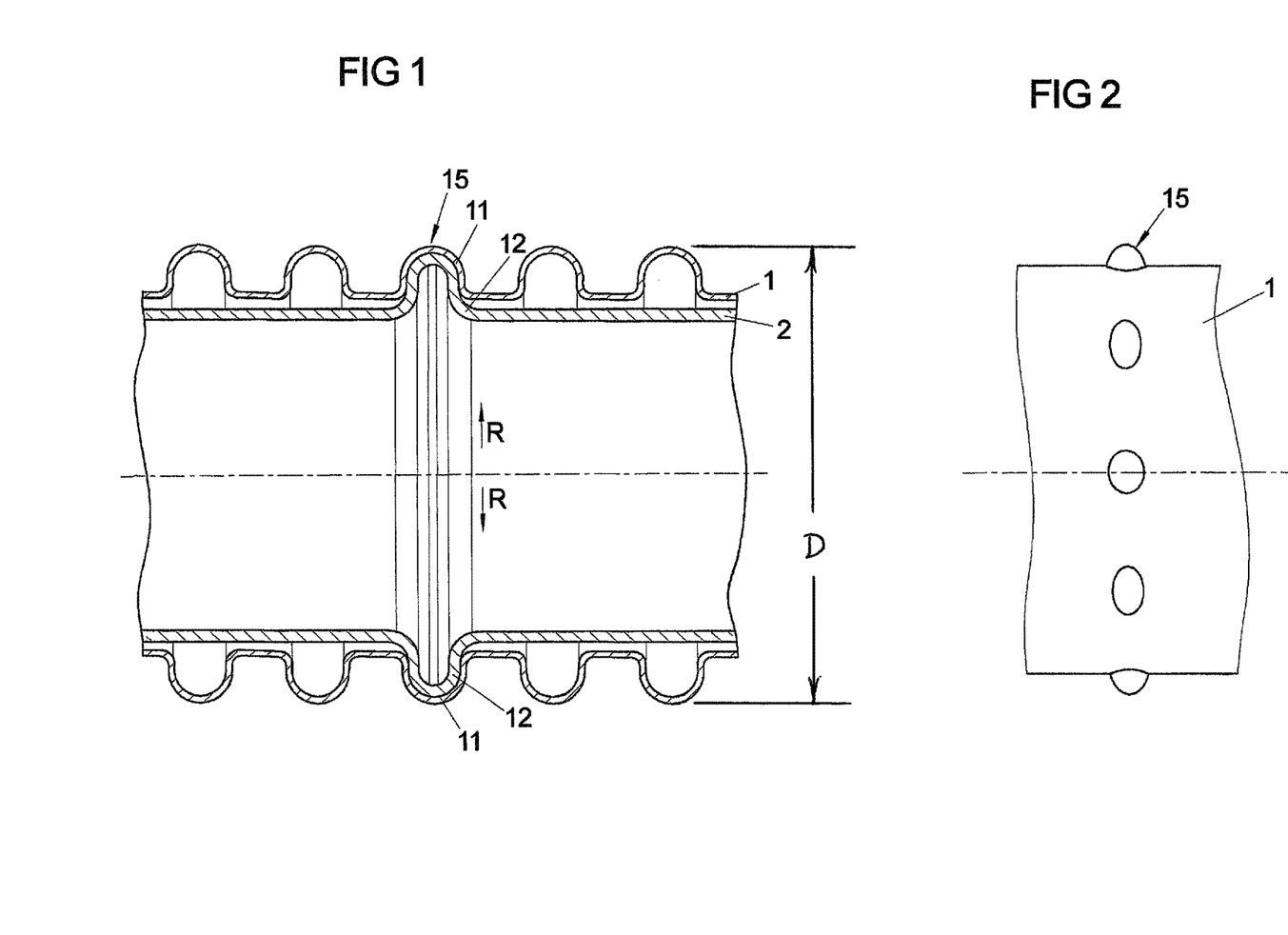
FIG. 1 shows a basic sectional view of a pipe component with two pipe elements non-rotatably connected with each other.
FIG. 2 shows a top view of a variant of the embodiment according to FIG. 1.

FIG. 1 shows the basic structure of the connection 15 of a pipe component. The pipe component includes a flexible outer pipe element 1 and an inner pipe element 2. The inner pipe element 1 here includes a pipe section which is deformed at one point.

The outer pipe element 1 includes two corrugated portions 21, 22 (see FIG. 3) to the left and right beside the connection 15, which are flatly connected with each other by a projection.

In this case, an inner pipe element 2 is arranged in an outer pipe element 1. It is, however, very well possible to arrange a plurality of inner pipe elements 2 in a plurality of outer pipe elements 1, which all are radially spaced from each other, so that air gaps each are present between the pipes.

In the embodiment shown here, the outer pipe element 1 is formed slightly thinner walled than the inner pipe element 2. In the inner pipe element 2 the thicker wall leads to the fact that after a deformation—which will yet be described below—the elastic recovery is less than in a thinner walled material. Hence, the thinner outer material always securely rests against the thicker inner material.

As materials for the outer pipe element 1 and/or the inner pipe element 2, e.g. austenitic stainless steels can be used, which have a sufficient deformability. It is, however, also possible to use other metallic materials, such as nickel-based materials, which do not fall under the category of stainless steels.

In the embodiment shown here, the inner pipe element 2 and the outer pipe element 1 are positively and non-positively connected with each other by a connection of two projections 11, 12. The manufacture of the projections 11, 12 will yet be explained in detail in connection with FIG. 4.

The projection 12 represents a circumferential bulge which points radially to the outside (direction of arrow R in FIG. 1). The projection 12 directed radially to the outside is surrounded by an equally shaped projection 11 of the outer pipe element 1. The projection 12 of the inner pipe element 2 is pressed into the outer pipe element 1 such that the two pipe elements 1, 2 are closely connected with each other. In axial direction a positive connection exists, in radial direction R a non-positive connection. The parallel outer surfaces of the projection 12 of the inner pipe element 2 flatly rest against the inner surfaces of the projection 11 of the outer pipe element 1. Thus, there is an engagement of the inner pipe element 2 into the outer pipe element 1, not only a partial contact. Furthermore, the outer diameter D of the outer pipe element 1 does not expand when the inner pipe element 2 is secured therein. Additionally, the projections 11, 12 positively restrain relative motion between the outer pipe element 1 and the inner pipe element 2 in both axial and tangential directions.

Due to this type of connection 15, the two pipe elements 1, 2 are non-rotatably secured against each other. Axially beside the connection 15, further corrugated portions 21, 22 can be arranged, for example (see FIG. 3). The production of the connection 15 by a deforming operation can be carried out quickly and efficiently, so that in particular a welding seam is not required.

FIG. 2 shows a variant of the embodiment shown in FIG. 1, wherein a top view of the pipe component is illustrated. Instead of a radially circumferential projection 11, 12, which in the first embodiment (FIG. 1) is caused by the projections, a projection has been incorporated in radial direction in the embodiment shown here merely at some punctual points on the circumference of the pipe elements 1, 2 (in FIG. 2 only the outer pipe element 1 is visible). This punctual deformation also leads to a non-rotatable connection 15 of the two pipe elements 1, 2. Here as well, a flat connection of inner pipe element 2 and outer pipe element 1 is produced in the region of the punctual deformation. The inner pipe element 2 not only rests against the outer pipe element 1, but engages into the same.

Figure 3:
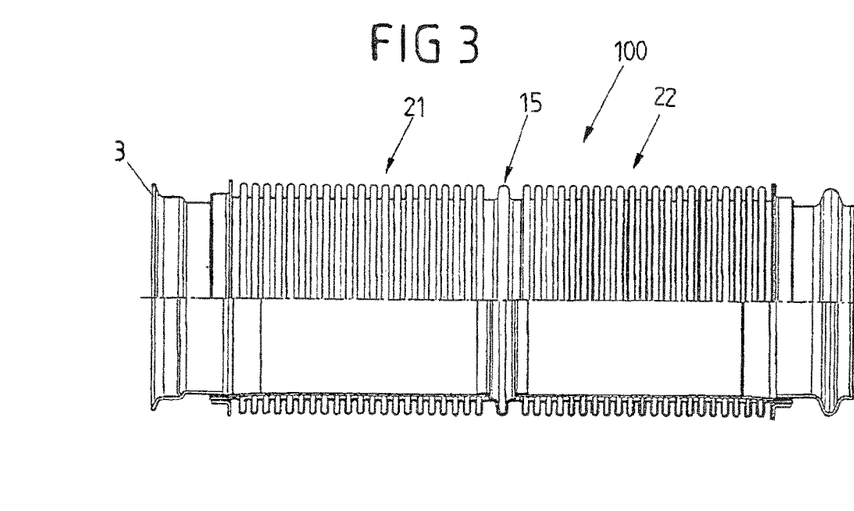
FIG. 3 shows an embodiment of the pipe component as exhaust-gas tube.

FIG. 3 shows an exemplary embodiment in which a pipe component 100 is represented with a connection 15 between two corrugated portions 21, 22. It can be seen that the connection 15 easily fits into the corrugation of the corrugated portions 21, 22.

For example in a motor vehicle, such flexible pipe component 100 can serve for decoupling an exhaust system from the engine or also for the decoupling between elements of the exhaust system.

The inner pipe element 2 includes two substantially smooth pipe sections 5 (e.g. a folded spiral-seam tube, possibly with a braid), which are connected with a connecting element 4. The smooth design results in a better flow guidance. There is also effected an improved insulation due to the air gap between inner pipe element 2 and outer pipe element 1.

In the illustrated embodiment (see FIG. 3A) the connecting element 4 also serves as spacer between inner and outer pipe element 1, 2 and as connecting element of the two pipe sections 5 of the inner pipe element 2. It is possible (as will yet be explained below) to connect the connecting element 4 as sleeve with the pipe sections 5 of the inner pipe element 2 and then deform the same, or a sleeve first is preformed as connecting element 4 (and possibly spacer) and then connected with the pipe sections 5 of the inner pipe element 2.

The outer pipe elements 1 each have a first corrugated portion 21 and a second corrugated portion 22. Since the outer corrugated portions 21 have a relatively low natural frequency and can vibrate in natural resonance due to engine and road surface excitations, damping of the system is expedient. This is achieved by a rubbing folded spiral-seam tube which is connected with the outer corrugated portions 21, 22 via the projection.

Figure 3A:
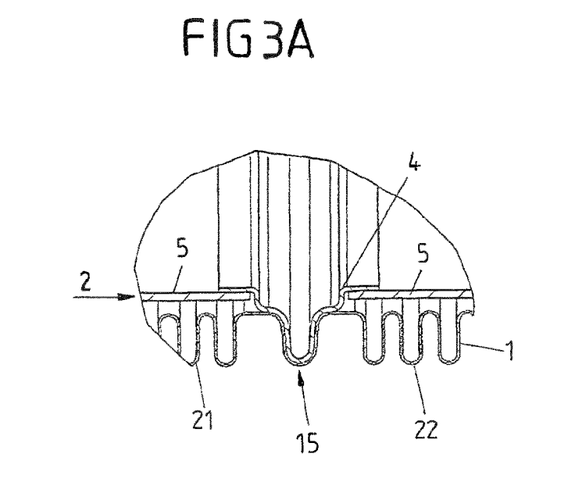

In FIG. 3A the region of the connection 15 from FIG. 3 is shown on an enlarged scale. It can clearly be seen that the inner pipe element 2 (with its two pipe sections 5 and the connecting means 3) outside the deformed region of the connection 15 is formed smooth on the inside.

Figure 4:
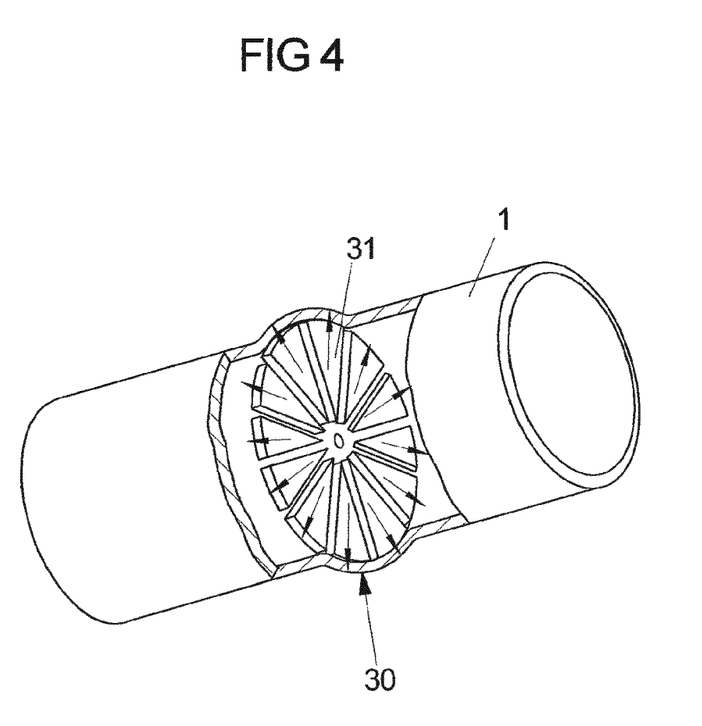
FIG. 4 shows a basic representation of a method for manufacturing a pipe component.

FIG. 4 schematically shows a punching tool 30 as deforming tool, which serves for simultaneously forming the projections 11, 12 in the pipe elements 1, 2. The punching tool 30 substantially has the shape of a disk which is subdivided into individual punching segments 31. By a suitable mechanism (for example a hydraulic system) the individual punching segments 31 can be moved radially to the outside. Due to the round outer contour of the punching elements 31, the inside of the inner pipe element 2 is deformed in radial direction, so that the outer pipe element 1 disposed around the same likewise is deformed. The punching tool 30 thus presses the two outer pipe elements 1, 2 together and hence produces a connection 15 due to the circumferential projection 11, 12 (as shown in FIG. 1).

There is produced an in-situ connection which does not require a particular design (e.g. a smooth region for applying a welding seam).

When the outer edge of the punching tool 30 is shaped differently, for example has an attached mandrel, a punctual deformation can be produced in the region of the connection 15, so that a connection 15, as shown in FIG. 2, can be achieved.

The connection 15 also can be achieved by means of other deforming tools 30, such as e.g. hydroforming devices, devices for deforming elastomers, a device for electromagnetic shaping and/or a device for roll forming. These methods or devices also can be used in combination with each other.

Figure 5:
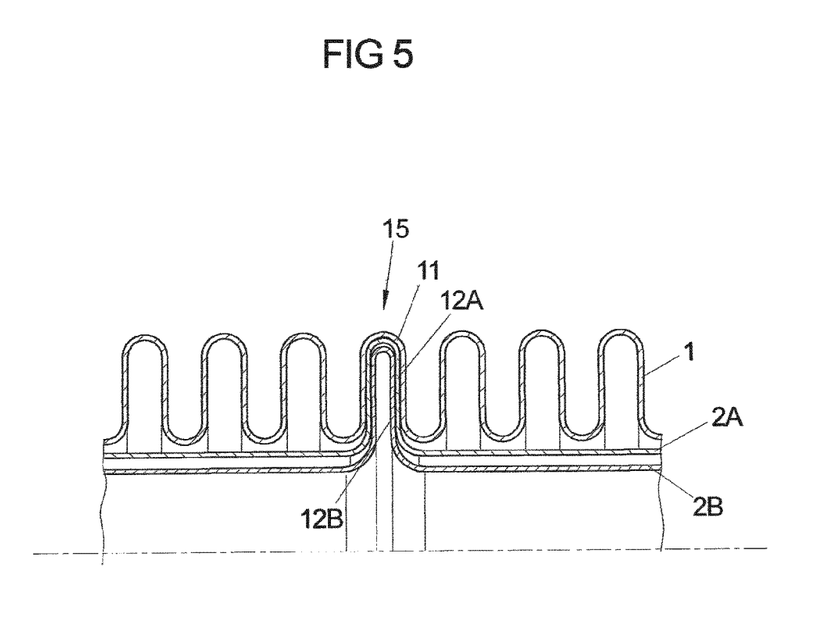
FIG. 5 shows a schematic representation of an outer pipe element with two inner pipe elements.

FIG. 5 schematically shows a sectional view through a pipe component with an outer pipe element 1 and two inner pipe elements 2A, 2B. The two inner pipe elements 2A, 2B each are formed smooth—apart from the region of the projection 11, 12A, 12B in the region of the connection 15. The radially circumferential projections 11, 12A, 12B are arranged such that in the region of the projection the side walls of an inner pipe element 2A, 2B each flatly rest against the projection of the pipe element arranged radially on the outside.

The inner pipe elements 2A, 2B each are formed integrally, i.e. there is no connecting means 4.

The outer surfaces of the side walls of the projection 12B of the first inner pipe element 2B flatly rest in parallel against the inner surfaces of the projection 12A of the second inner pipe element 2A. The outer surfaces of the projection 12A of the second inner pipe element 2A in turn rest against the inside of the projection 11 of the outer pipe element 1. In essence, a plurality of corrugations here are inserted into each other in radial direction.

Figure 6:
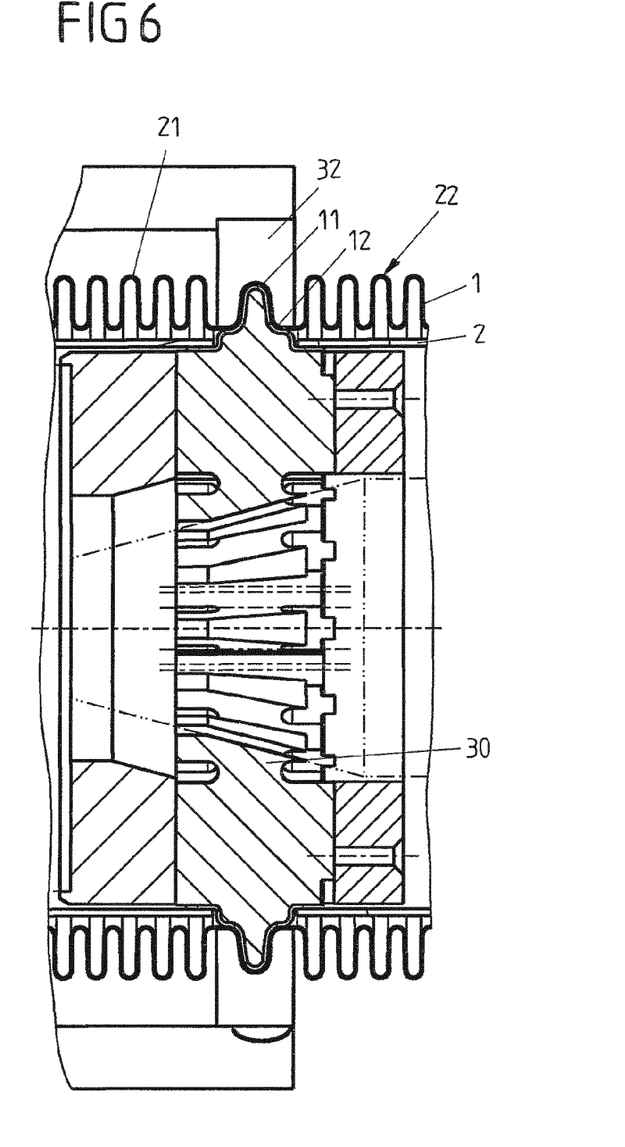
FIG. 6 shows a sectional representation of an embodiment of a deforming tool with female die.

FIG. 6 shows an embodiment of a deforming tool 30. On the circumference of the deforming tool 30, which here is formed as spreading tool, a bead is mounted, which deforms the smooth inner pipe element 2 such that the projection 12 of the inner pipe element 1 is pressed into the projection 11 of the outer pipe element 2. A female die 32 is arranged on the circumference of the projection 11 on the outside of the outer pipe element 2 and during the deforming operation forms the abutment for the deforming tool 30.

Independent of whether an inner pipe element 2 with a preformed connecting means 3 or with a connecting means preformed in situ is used, the manufacture of the at least partly flat connection of the outside of the projection 12 of the at least one inner pipe element 2 with the inside of the projection 11 of the outer pipe element 1 (or another inner pipe element 2, as in FIG. 5) generally requires a possibly additional projection or indentation, in order to possibly overcome an undercut.

LIST OF REFERENCE NUMERALS

1 outer pipe element
2, 2A, 2B inner pipe element
3 flange element
4 connecting element
5 pipe sections
11 projection of outer pipe element
12 projection of inner pipe element
15 connection between inner pipe element and outer pipe element
21 first corrugated portion
22 second corrugated portion
30 deforming tool, spreading tool
31 movable element at the spreading tool
32 female die
100 pipe component; exhaust-gas pipe component

The invention claimed is:

1. A pipe component comprising an outer pipe element and at least one inner pipe element arranged inside the outer pipe element, wherein the outer pipe element is formed as a flexible pipe element having an outer diameter with at least one projection and wherein
    on at least one point the outer pipe element and the at least one inner pipe element each have a projection pointing to the outside in a radial direction, wherein the outside of the projection of the at least one inner pipe element at least partially conforms with the inside of the projection of the outer pipe element or of another inner pipe element, so that by means of the projections a connection exists between the at least one inner pipe element and the outer pipe element, wherein the outer diameter of the outer pipe element does not change when the inner pipe is secured thereto;
    wherein the projections positively restrain relative motion between the outer pipe element and the inner pipe element in both axial and tangential directions.

2. The pipe component according to claim 1, wherein the at least one inner pipe element includes at least two pipe sections and at least one connecting element for connecting the pipe sections.

3. The pipe component according to claim 1, wherein the at least one inner pipe element includes a pipe section.

4. The pipe component according to claim 1, wherein the at least one inner pipe element is formed as a flexible pipe element.

5. The pipe component according to claim 1, wherein the projections at least partly are circumferentially formed around the outer pipe element and around the at least one inner pipe element.

6. The pipe component according to claim 1, wherein the projections have a positive radial connection by substantially punctual protrusions.

7. The pipe component according to claim 1, wherein the at least one connection is formed as a non-rotatable connection.

8. The pipe component according to claim 1, wherein the wall thickness of the outer pipe element is smaller than the wall thickness of the at least one inner pipe element.

9. The pipe component according to claim 1, wherein the outer pipe element and/or the at least one inner pipe element at least partly have a flexible corrugated portion.

10. The pipe component according to claim 1, wherein it is formed as at least one part of an exhaust-gas pipe component.

11. The pipe component according to claim 10, wherein the outer pipe element includes at least two corrugated portions and the connection between the outer pipe element and the at least one inner pipe element is arranged between the at least two corrugated portions.

12. The pipe component according to claim 1, wherein on at least one of the ends of the at least one inner pipe element a flange element is arranged.

13. The pipe component according to claim 1, wherein the outer pipe element and the at least one inner pipe element are connected at the axial ends of the exhaust-gas pipe component.

14. The pipe component according to claim 1, wherein between the at least one inner pipe element and the outer pipe element or another inner pipe element a sleeve-shaped spacer is arranged.

15. The pipe component according to claim 1, further comprising at least one connecting element for keeping the distance between the at least one inner pipe element and the outer pipe element.

16. A method for manufacturing a pipe component, wherein a) at least one inner pipe element is arranged in a flexible outer pipe element with at least one projection, wherein the outer pipe element has an outer diameter,
b) a deforming tool is introduced into the at least one inner pipe element,
c) directed radially to the outside from the deforming tool a plastic deformation of the at least one inner pipe element and of the outer pipe element is effected, wherein the deformation is carried out such that,
d) the outside of a projection of the at least one inner pipe element at least partly flatly rests against the inside of the projection of the outer pipe element or against the inside of the projection of another inner pipe element, so that by means of the projections a connection between the at least one inner pipe element and the outer pipe element is produced, wherein the outer surface is defined by the outer diameter of the outer pipe element and is not expanded during this deformation.

17. The method according to claim 16, wherein the deforming tool includes elements with a substantially arc-shaped outer contour, which are movable radially to the outside.

18. The method according to claim 16, wherein the deforming tool includes elements with a contour pointing substantially acutely to the outside, which are movable radially to the outside.

19. The method according to claim 16, wherein the deforming tool is a spreading tool, a hydroforming tool, a device for deforming with elastomers, a device for electromagnetic shaping and/or a device for roll forming.

20. The method according to claim 16, wherein when forming the projection on the outside of the outer pipe element, a female die is held against the outside of the outer pipe element as a negative mold for the projection.

21. The method according to claim 16, wherein the connecting element is preformed already with a projection, and wherein then the outside of the projection of the at least one inner pipe element at least partly flatly rests against the inside of the projection of the outer pipe element or against the inside of the projection of another inner pipe element, so that by means of the projections a connection between the at least one inner pipe element and the outer pipe element is produced.

22. The method according to claim 16, wherein directed radially to the outside from the deforming tool a plastic deformation of the at least one inner pipe element is effected such that a smooth pipe or a connecting element is deformed.

* * * * *